US006529245B2

(12) United States Patent
Watanabe et al.

(10) Patent No.: US 6,529,245 B2
(45) Date of Patent: Mar. 4, 2003

(54) DISPLAY DEVICE ALSO COMPATIBLE WITH DIGITAL BROADCASTS

(75) Inventors: Toshimitsu Watanabe, Yokohama (JP); Yukimi Saiki, Ota-ku (JP); Kazuhiko Yoshizawa, Yokohama (JP); Masahisa Tsukahara, Fujisawa (JP)

(73) Assignees: Hitachi, Ltd., Tokyo (JP); Hitachi Video and Information Sysmte, Inc., Yokohama (JP)

( * ) Notice: Subject to any disclaimer, the term of this patent is extended or adjusted under 35 U.S.C. 154(b) by 0 days.

(21) Appl. No.: 09/949,958

(22) Filed: Sep. 12, 2001

(65) Prior Publication Data

US 2002/0030759 A1 Mar. 14, 2002

Related U.S. Application Data

(63) Continuation of application No. 09/139,116, filed on Aug. 24, 1998, now Pat. No. 6,288,748.

(30) Foreign Application Priority Data

Sep. 3, 1997 (JP) .............................................. 9-238417

(51) Int. Cl.[7] .................................................. H04N 5/46
(52) U.S. Cl. ...................................................... 348/556
(58) Field of Search ................................ 348/556, 555, 348/554, 445, 511, 558, 553; 345/699; H04N 5/46

(56) References Cited

U.S. PATENT DOCUMENTS

| 4,215,295 A | 7/1980 | Inoue et al. | |
|---|---|---|---|
| 4,451,848 A | 5/1984 | Okada et al. | 348/448 |
| 4,651,209 A | 3/1987 | Okada et al. | 348/447 |
| 4,730,148 A | 3/1988 | Nakata | 315/397 |
| 4,942,341 A | 7/1990 | Imaizumi | |
| 5,502,496 A | 3/1996 | Hailey, Sr. et al. | 348/462 |
| 5,990,970 A | * 11/1999 | Choi | 348/556 |
| 6,064,445 A | * 5/2000 | Kim et al. | 348/556 |
| 6,137,537 A | * 10/2000 | Tsuji et al. | 348/554 |
| 6,144,412 A | * 11/2000 | Hirano et al. | 348/445 |
| 6,288,748 B1 | * 9/2001 | Watanabe et al. | 348/511 |
| 6,392,708 B1 | * 5/2002 | Cho | 348/556 |

FOREIGN PATENT DOCUMENTS

| JP | 61-57751 | 12/1986 |
|---|---|---|
| JP | 62-247678 | 10/1987 |
| JP | 63-9176 U | 3/1988 |
| JP | 63-164761 | 7/1988 |
| JP | 64-68069 | 3/1989 |
| JP | 1-146290 U | 10/1989 |
| JP | 2-76374 | 3/1990 |
| JP | 2-84809 | 3/1990 |
| JP | 4-82378 | 3/1992 |
| JP | 4-352570 | 12/1992 |
| JP | 5-18170 U | 3/1993 |
| JP | 5-153421 | 6/1993 |
| JP | 7-44130 U | 10/1995 |

* cited by examiner

Primary Examiner—Michael Lee
(74) Attorney, Agent, or Firm—Antonelli, Terry, Stout & Kraus, LLP (57) ABSTRACT

A digital television signal receiver includes a decoder, capable of decoding digital television signals having a plurality of different formats, which outputs video information in which image fields having mutually different numbers of scanning lines appear aperiodically when the decoder decodes a digital television signal having a specific one of the different formats; a display device which displays an image based on the video information output from the decoder; and an image controller which sets respective display start positions for the image fields having mutually different numbers of scanning lines to a same display start position in a vertical direction when the display device displays an image based on the video information output from the decoder when the decoder decodes the digital television signal having the specific format.

5 Claims, 5 Drawing Sheets

DISPLAY DEVICE ALSO COMPATIBLE WITH DIGITAL BROADCASTS

CROSS-REFERENCE TO RELATED APPLICATION

This application is a continuation of application Ser. No. 09/139,116 filed on Aug. 24, 1998 now U.S. Pat. No. 6,288,748, the contents of which are incorporated herein by reference in their entirety.

BACKGROUND OF THE INVENTION

1. Field of the Invention

This invention relates in general to a display device for showing video information whose number of scanning lines changes over elapsed time per each field, and relates in particular to a display device which is ideal for preventing vertical jitter from occurring during the display of video information having changes in the number of scanning line that occur at random. This invention is suited for display, for instance, of digital broadcasts, or joint display of both digital broadcasts and analog broadcasts.

2. Description of the Related Art

Digital technology has been making steady progress in the area of broadcasting in recent years. In order for display equipment such as, for instance, television receivers to keep pace with this progress, the display equipment must be able to display digital broadcast signals as well as analog broadcast signals and VTR playback signals. Circuit systems are therefore being designed to make receivers compatible with digital broadcasts. A decoded digital broadcast signal is therefore written temporarily into a field memory and then utilized in a readout system. Analog signals of the currently used NTSC method are subjected to analog/digital (A/D) conversion and then input to a digital signal processing circuit and written along with the digital broadcast signal into a field memory.

The writing and reading of video information into the field memory is performed by utilizing the read block and vertical and horizontal synchronizing signals. However, when the digital broadcast signal is, for instance, an MPEG2 type signal and has been compressed, no synchronizing signal is sent from the transmitter. Accordingly, a synchronizing signal must be generated and a read signal formed by the receiver in order to read out the information from the field memory. However, a difference in frequency sometimes occurs between the write signal for writing into the field memory, and the read signal for readout from the field memory. This difference in frequency results in reversed timing or an opposite phenomenon called "skip" occurring between the memory writing and readout operations.

When this memory skip occurs, the current field image on one frame of the screen and the image from one previous field are mixed together, thus requiring some contrivance to prevent memory skip from occurring. The changes particularly in the vertical frequency are particularly large in cases such as the custom playback of VTR signals. One method to prevent memory skip from occurring at such times is by changing the number of scanning lines per field. One example of this is television receivers in Europe capable of receiving broadcast teletext or subscript transmissions. These receivers are set to have alternate scanning lines of 312 lines by 313 lines per field (PAL etc.) or 262 lines by 263 lines (NTSC) with non-interlaced scanning used for display of the teletext broadcast screen.

However, a feedback circuit for uniform vertical amplitude is provided in the vertical deflection circuit of the CRT display. Consequently, a vertical jitter at 60 Hz occurs when attempting to display video information in which the alternate scanning lines are 312 lines by 313 lines (or 262 by 263 lines) per field on the CRT display. A technology that has been proposed to reduce this vertical jitter is disclosed in Japanese Examined Utility Model Publication No. 7-44130. This method isolates the circuit for aligning vertical amplitude and the feedback circuit, and utilizes a differentiator circuit consisting of a resistor and capacitor to cut the DC components and apply feedback signals to the vertical amplifier amplitude control terminal.

However, in video information formed for a system designed for joint use of conventional analog broadcasts and expanding systems utilizing MPEG2 for handling digital broadcasts, the number of scanning lines will not always mutually increase and decrease per field. In such cases, the increase or decrease in the number of scanning lines per field will be a factor appearing randomly in the synchronizing signal status of the input signal. Consequently, vertical jitter will still be difficult to suppress, even if the technology disclosed in the above patent is adopted in the above system, since the system permits creation of video information in which changes in the number of scanning lines per field appear at random.

SUMMARY OF THE INVENTION

This invention, which takes the above problems into account, has the objective of providing a display capable of satisfactory suppression of vertical jitter, even when displaying video information in which changes in the number of scanning lines per field appear at random.

In order to achieve the above mentioned objectives, this invention is characterized in being comprised of a receiving means to receive digital broadcast, a decoding means to decode the digital broadcast signal from the receiving means and then output video information containing at least a first and a second field with a mutually different number of scanning lines, a display means to display images utilizing the video information output from the decoding means, and a display control means for setting the same start position for the first and the second fields on the screen of the display means.

The display unit of this invention is comprised of a memory for storing the video information output from the decoding means, a clock generator to generate a read clock for readout of video information stored in the memory, and a D/A (digital/analog) converter to perform digital to analog conversion of the video information read out from the memory and supply the converted information to the display means.

The display control means may also be comprised of a vertical ramp waveform generator circuit to generate a vertical ramp waveform for performing vertical deflection, and a clamp circuit to maintain a uniform voltage for the first field and the second field that corresponds to the vertical retrace period of the vertical ramp waveform formed in the vertical ramp waveform generator circuit.

This vertical ramp waveform generator circuit operates in synchronization with a vertical synchronizing signal and may contain a switch to charge the capacitor with electrical current from the power supply during the vertical scanning period and to discharge the capacitor during the vertical retrace period.

The clamp circuit is synchronized with the vertical synchronizing signal and may include a switch to link the fixed DC voltage to the vertical ramp waveform.

The vertical ramp waveform generator circuit is further comprised of a counter to count the read clock generated by the clock generator, and a D/A converter to perform digital to analog conversion of the output signal from the counter and output a vertical ramp waveform. The clamp circuit may include a reset circuit to reset the count from the counter according to the vertical synchronizing signal.

The display control means may be comprised of a vertical ramp waveform generator circuit, a comparator to compare a reference voltage corresponding to a reference number of scanning lines per one field versus a voltage corresponding to a number of scanning lines for the first field and the second field read out from the memory, and output a control signal according to the comparison results, and a variable voltage power supply for controlling the direct current component of the vertical ramp waveform for performing vertical deflection according to the control signal output from the comparator.

The display control means may be comprised of a vertical ramp waveform generator means to generate a vertical ramp waveform for performing vertical deflection, and an amplifier control means to control feedback of the amplitude of the vertical ramp waveform generated in the vertical ramp waveform generator means.

The amplitude control means includes a rectifier to rectify the vertical ramp waveform, and if the rectifier time constant is set at 80–120 ms, then there is no follow-up (slaving) to changes in the field frequency between a plurality of fields.

The amplitude control means may also be provided with a rectifier to rectify the vertical ramp waveform, and a time constant adjustment circuit to adjust the time constant of the rectifier according to the status of the display unit.

This time constant adjustment circuit may adjust the time constant when power to the display device is turned on in order to make the time constant smaller than in normal operation. In such a case, the time constant may be set at 10 ms or less at the time when the power to the display device is turned on, and set at 400–600 ms during normal operation.

DETAILED DESCRIPTION OF THE INVENTION

Embodiments of the invention will now be described with reference to the accompanying drawings.

Figure 1:
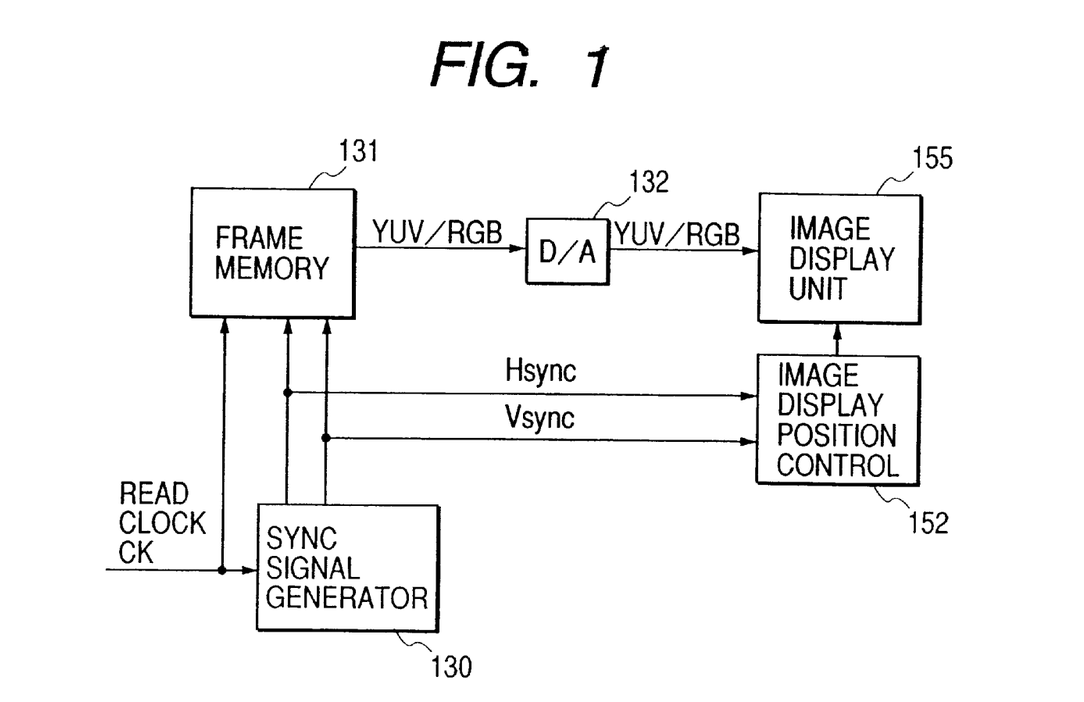
FIG. 1 is a block diagram of an essential portion of the display device of this invention.

FIG. 1 is a block diagram of an essential portion of the display device of this invention. The display device is mainly comprised of a frame memory 131, a D/A converter 132, a synchronizing signal generator 130, an image display position control unit 152, and an image display unit 155. In the frame memory 131, a digitized image such as a video signal for 1 field is assigned to and written at an address corresponding to a horizontal dot and a vertical line. The synchronizing signal generator 130 is input with a read clock (CK), and generates a horizontal synchronizing signal (H sync) and a vertical synchronizing signal (V sync). The CK, H sync, and V sync are input to the frame memory 131 and the pulses are then counted by an address counter contained in, for instance, the frame memory 131. The count from the address counter is utilized as address information, digital data of images from the field memory address corresponding to this address information is read out, and the result is converted to an analog video signal (YUV or RGB) by way of the D/A converter 132 and input to the image display unit 155. Further, the H sync and V sync signal generated in the synchronizing signal generator 130 are also input to the image display position control unit 152 and serve to control the display position of the video of the image display unit 155.

The physical conditions of the display device utilized in the display device configured as described above, and the relation of the fields utilized in this display device versus the number of scanning lines per field, are shown in Table 1.

TABLE 1

| Item No. | Conditions | Field No. 1 | 2 | 3 | 4 | 5 | 6 |
|---|---|---|---|---|---|---|---|
| 1 | 1080 i, 30 fps | 562.5 | 562.5 | 562.5 | 562.5 | 562.5 | — |
| 2 | 1080 i, 29.97 fps | 562.5 | 563.5 | 562.5 | 562.5 | 562.5 | — |
| 3 | 540 P, 60 fps | 562 | 563 | 562 | 563 | 562 | — |
| 4 | 540 P, 59.94 fps | 563 | 563 | 562 | 563 | 562 | — |

As shown in Item No. 1, when using a display with a total of 1125 scanning lines and an interlaced display with 1080 effective scanning lines at a vertical synchronizing frequency of 60 Hz in which case the frame frequency will be 30 fps, the scanning lines per field will be a repetitive 562.5 lines. Here, fps is an abbreviation signifying units of frames per second, i is skip scanning (interlaced scanning), and p is sequential scanning (progressive scanning). In a digital type high vision system, the vertical synchronizing frequency may be 59.94 Hz in which case the frame frequency will be 29.97 fps. As shown in Item No. 2, in this case a field having 562.5 scanning lines is present along with a field having 563.5 scanning lines for handling a frame frequency that averages 29.97 fps. Further, when using a non-interlaced display of 540 effective scanning lines, a total of 1125 scanning lines, and a vertical synchronizing frequency of 60 Hz in which case the frame frequency will be 60 fps, the scanning lines per field will be a repetitive 562 by 563 lines per field as shown in Item No. 3. Additionally, when the vertical synchronizing frequency is 59.94 Hz in which case the frame frequency will be 59.94 fps under the same conditions for effective scanning lines and the scanning system, then, as shown in Item No. 4, the number of fields having 562 scanning lines is fewer than shown in Item No.

3 (the ratio of the number of fields having 563 scanning lines to the number of fields having 562 scanning lines is smaller than in Item No. 3), and the frame frequency can be set to an average of 59.94 fps. In this kind of system, the read clock can be just a single frequency and the cost will be economical.

In this system, the number of scanning lines per one field changes over elapsed time so that accurate control of the video image position with the image display position control unit 152 is necessary. A specific example of this image display position control unit 152, in other words, the first embodiment of this invention, is shown in FIG. 2.

Figure 2:
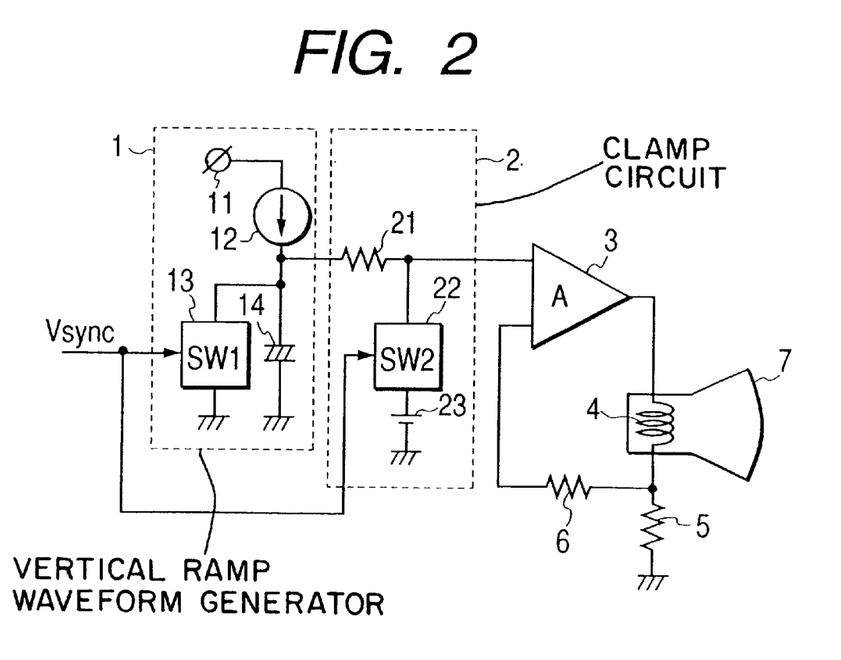
FIG. 2 is a circuit schematic showing a specific example of an image display control unit of the first embodiment of this invention.

FIG. 2 is a circuit diagram showing the image display position control unit 152, and in particular shows the vertical deflection circuit operated by V sync. This circuit is comprised of a vertical ramp waveform generator 1 to generate a vertical ramp waveform to drive the vertical deflection coil 4, a clamp circuit 2 to clamp the voltage for the vertical retrace period of the vertical ramp waveform, an amplifier 3 for amplifying the vertical ramp waveform, a vertical deflection coil 4 for performing vertical deflection of the electron beam, resistors 5 and 6, and a cathode ray tube 7. Also, the vertical ramp waveform generator 1 is comprised of a power supply terminal 11, a current source 12, a first switch element (SW1) 13, and a capacitor 14. The clamp circuit 2 is comprised of a resistor 21, a second switch element (SW2) 22, and a power supply 23. The operation of this circuit is described using FIG. 3.

Figure 3:
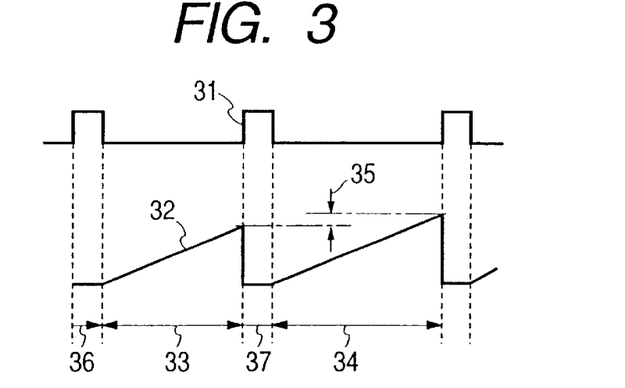
FIG. 3 is a waveform chart illustrating operation of the circuit shown in FIG. 2.

The operation of the vertical ramp waveform generator 1 is first explained. The waveform 31 of FIG. 3 is for V sync and is input to the first switch element 13. The terminal voltage at the capacitor 14 is zero (0) when the V sync is high (period 36) and the first switch element 13 is on during the vertical retrace period. On the other hand, the first switch element 13 is off when the V sync is low (period 33) and the capacitor 14 is charged by the current source 12. Consequently, the voltage at the terminal of the capacitor rises at a fixed slope, and a ramp waveform having a fixed slope is generated as shown by 32 in FIG. 3. The V sync then returns to a high level (period 37) and the first switch element 13 closes, the charge stored in the capacitor 14 is discharged, and the voltage at the capacitor terminal becomes zero. The process continually repeats in order to generate the ramp waveform.

The slope for the period 33 of the ramp waveform 32 and the slope for the period 34 are identical, but a difference 35 occurs in the peak values when the period 34 is longer than the period 33 (in other words, when the number of scanning lines between adjacent fields is different). The difference in peak values causes a voltage fluctuation in the vertical retrace period of the vertical ramp waveform. When the voltage fluctuates during this period, the display position on the screen varies up and down (vertically) and the so-called vertical jitter occurs. In order to prevent this vertical jitter, this invention provides a clamp circuit to fix the voltage in the vertical retrace period of the vertical ramp waveform. The operation of this clamp circuit is discussed next.

The V sync shown in the waveform in FIG. 3 also receives an input from the second switch element 22. The second switch element 22 closes when the V sync is high, in the vertical retrace period (periods 36, 37) and the direct current voltage output from the power supply 23 is coupled with the vertical ramp waveform 32 output from the vertical ramp waveform generator circuit 1 by way of the resistor 21. Also, the second switch element 22 opens in the period when the V sync is low (periods 33, 34) and the coupling between the vertical ramp waveform and the power supply 23 is eliminated. Therefore, even if a fluctuation in the peak value of the vertical ramp waveform occurs, the voltage in the vertical retrace period can be clamped to a fixed value by means of the direct current voltage output from the power supply 23 so that voltage fluctuations within the period can be prevented.

This clamped vertical ramp waveform is input to the amplifier 3 and current conversion is performed in the vertical deflection coil 4 by way of the vertical deflection coil 4 and the resistors 5, 6. Accordingly, the vertical start position of the cathode ray tube 7 can be constantly maintained at a fixed position. As a result, even when the number of scanning lines per field has changed, the scanning start position of the electron beam will be maintained at a constant fixed position so that a satisfactory screen image without vertical jitter can be obtained.

Figure 4:
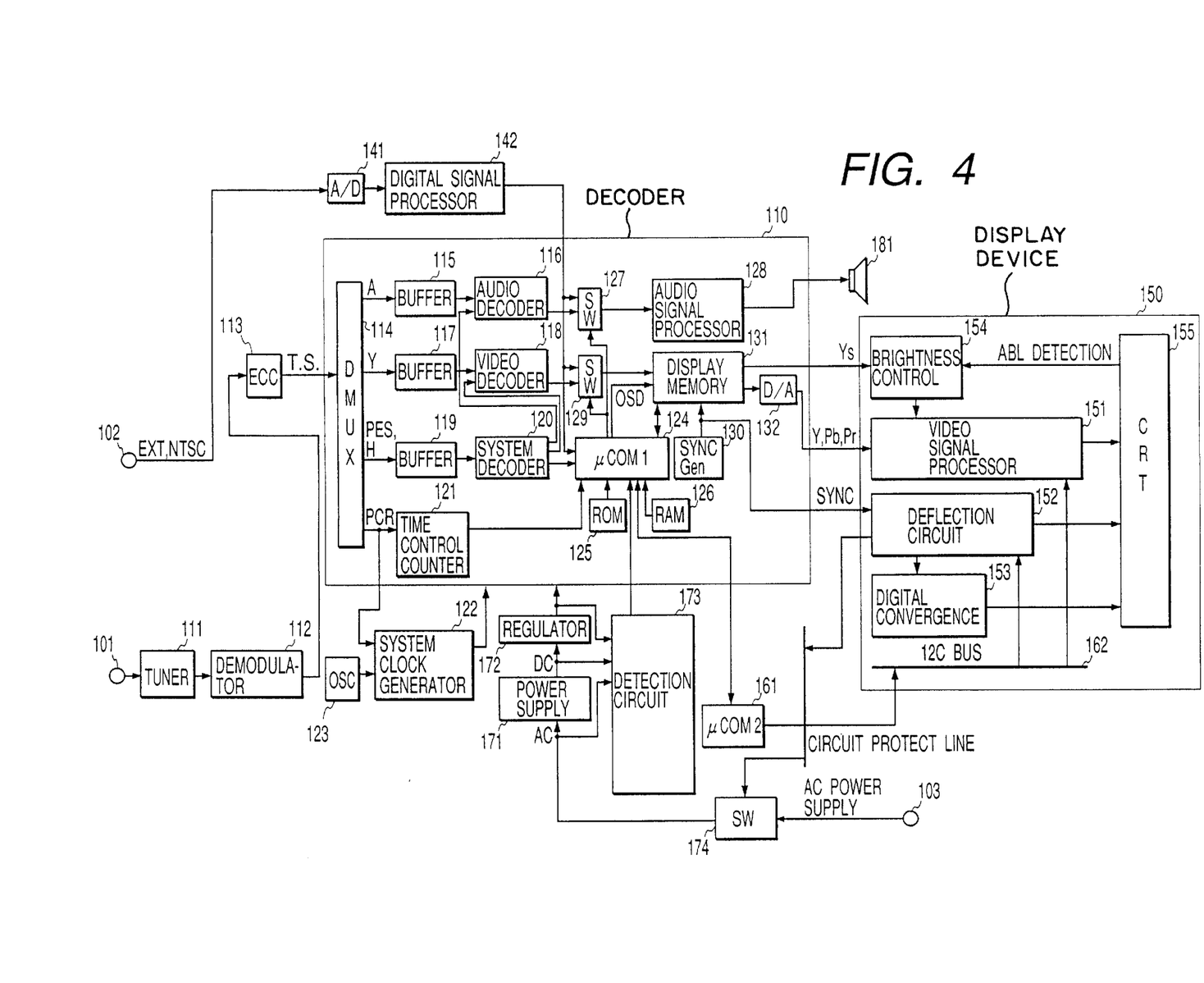
FIG. 4 is a circuit diagram showing an example of the digital television of the first embodiment of this invention shown in FIG. 2.

FIG. 4 is a circuit diagram showing an example of the image display position control unit adopted for digital television in the embodiment of this invention shown in FIG. 1 and FIG. 2. In FIG. 4, 101 denotes the input terminal for a received digital broadcast signal, 102 denotes the input terminal for video and audio signals of the NTSC method, 103 is the input terminal for the AC power supply for inputting 100 volts AC, for instance, in Japan, 110 denotes the decoder mainly for decoding the video signals and audio signals compressed with the MPEG2 method, 111 denotes the digital broadcast tuner, 112 is the demodulator, 113 is the error correction circuit, 114 denotes the demultiplexer, 115 denotes the audio data buffer, 116 denotes the audio decoder, 117 denotes the video data buffer, 118 is the video decoder, 119 denotes the system data buffer, 120 denotes the system decoder, 121 is the time control counter, 122 denotes the system clock generator for generating a main clock pulse for the decoder 110, 123 denotes the oscillator, 124 denotes the first control circuit such as a microprocessor for controlling each section mainly in the decoder 110, 125 denotes the custom readout memory (hereafter referred to as a ROM) for storing the basic control information of each section of the decoder 110, numeral 126 denotes the nonvolatile read/write memory (hereafter referred to as a RAM), 127 denotes a first switch, 128 denotes the audio signal processor, 129 denotes a second switch, 130 denotes a synchronizing signal generator for generating a horizontal synchronizing signal as well as a vertical synchronizing signal, etc., the numeral 131 denotes a display memory for interpolation processing of the digital video signal that was input and for performing luminance level control of the frame signal when a frame signal has been input, the numeral 132 denotes a D/A converter, 141 denotes an A/D converter and 142 denotes a signal processing circuit for processing signals such as by Y/C isolation and A/D conversion of analog video and audio signals of the NTSC method input from the terminal 102, numeral 150 denotes a display device for displaying video signals formed by specified processing, 151 denotes a video signal processor, 152 denotes the deflection circuit, 153 denotes the digital convergence circuit, 154 denotes the brightness control circuit, 155 denotes the CRT for the 16:9 aspect ratio, 161 denotes the second control circuit such as a microprocessor for performing control of the overall system of the video signal display unit of this embodiment, 171 denotes the power supply circuit for generating DC power from the 100 volts AC supplied from the input terminal 103, 172 denotes the regulator, 173 denotes the detector circuit for monitoring the input/output of the power supply 171 and the regulator 172 and detecting power supply abnormalities, numeral 174 denotes the power supply switch for cutting off AC input power from the input terminal 103, and numeral 181 denotes the speaker for outputting the audio. The frame memory 131, the D/A converter 132, the synchronizing signal generator 130, and the image display unit 155 shown in FIG. 1 respectively correspond to the display memory 131, the D/A converter 132, the synchronizing signal generator 130, and the CRT 155 in FIG. 4, and the read clock signal CK input to the synchronizing signal generator 130 in FIG. 1 is formed based on the system clock from the system clock generator circuit 122. Further, the image display position control unit 152 explained using FIG. 1 and FIG. 2 is contained inside the deflection circuit 152 in FIG. 4.

Figure 5:
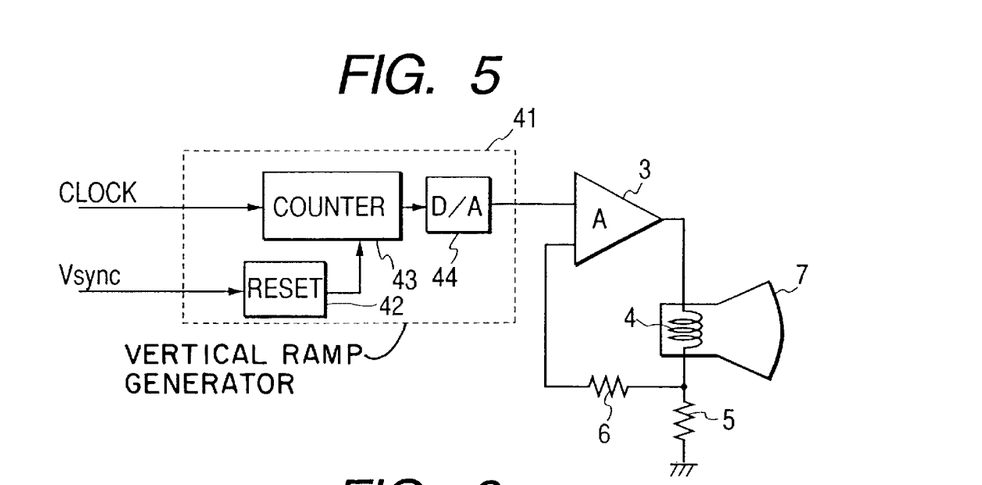
FIG. 5 is a circuit diagram showing an example of the image display position control unit of the second embodiment of this invention.
Figure 6:
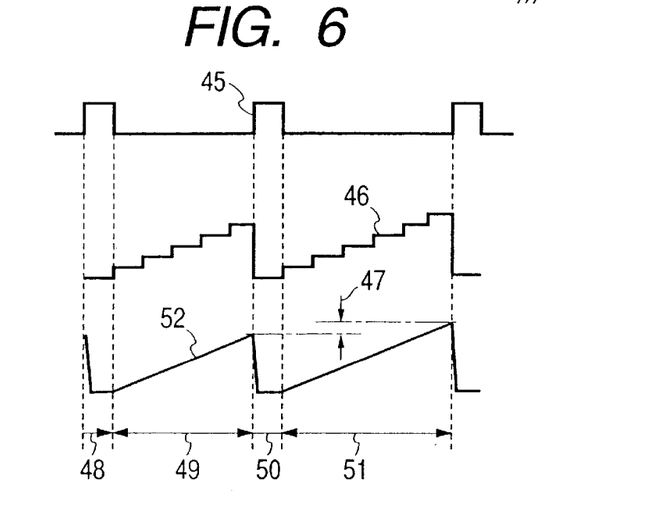
FIG. 6 is a waveform diagram illustrating the operation of the circuit shown in FIG. 5.

FIG. 5 is a circuit diagram showing an example of the image display position control unit of the second embodiment of this invention. The circuit of the image display position control unit is comprised of a vertical ramp waveform generator 41, an amplifier 3, a vertical deflection coil 4, resistors 5 and 6, and a cathode ray tube 7. The vertical ramp waveform generator 41 is comprised of a reset element 42, a counter 43, and a D/A converter 44. Circuit operation is explained while referring to FIG. 6. When the clock signal (for instance, the read clock CK) is input to the counter 43, the pulses of the clock signal are counted in the scanning period 49 and a waveform 46 is output. The waveform 46 is input to the D/A converter 44 and the analog conversion results are output as a waveform such as shown by 52 in FIG. 6. At this time, a difference in the clock count for each period occurs when the period 51 is greater than the period 49 (in other words, when the number of scanning lines for adjacent fields is different). Consequently, a difference 47 occurs between the peak value of the waveform for the field in the period 49 and the peak waveform for the field in the period 51. However, in this embodiment, the reset element 42 triggers reset of the counter 43 in the periods 48 and 50 when the V sync signal 45 is high so that the voltage for the applicable period is constantly kept at a value corresponding to the count reset value, and the voltage of the vertical retrace period is constantly maintained at this value. The ramp waveform having this direct current information is current converted in the vertical deflection coil 4 by way of the deflection coil 4 and the resistors 5, 6. Consequently, the electron beam of the cathode ray tube 7 can be constantly maintained at the vertical start position. As a result, even if a change occurs in the number of horizontal scanning lines per field, a fixed scanning start position for the electron beam is constantly maintained so that a satisfactory screen without jitter can be obtained. The circuit described here is of course applicable to the system in FIG. 4.

Figure 7:
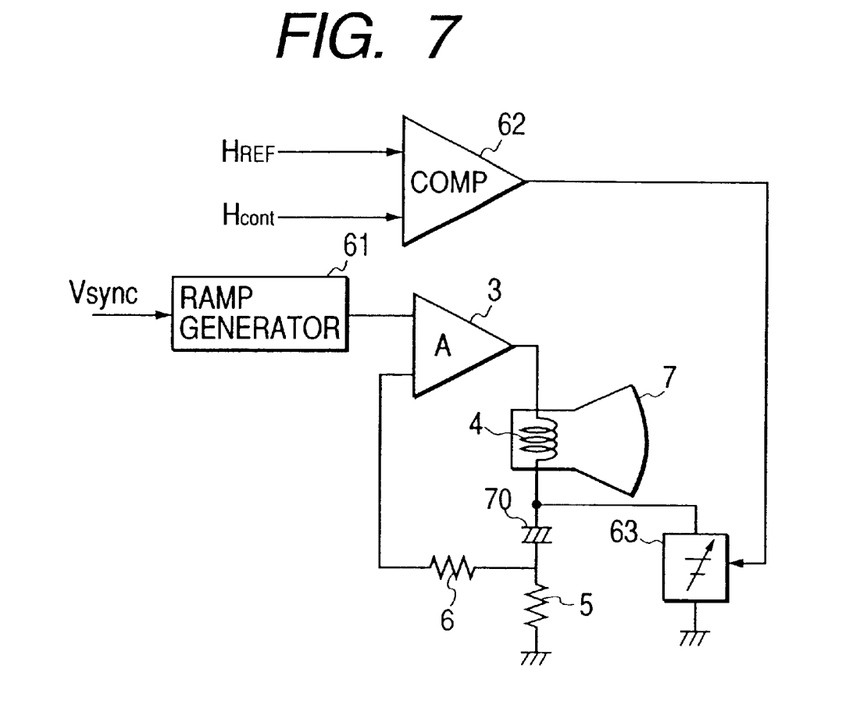
FIG. 7 is a circuit diagram showing an example of the image display position control unit of the third embodiment of this invention.
Figure 8:
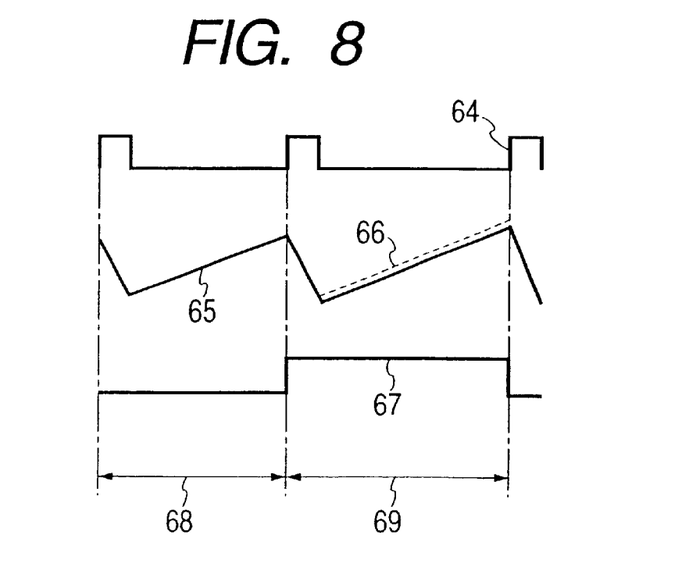
FIG. 8 is a waveform diagram illustrating the operation of the circuit shown in FIG. 7.

FIG. 7 is a circuit diagram showing an example of the image display position control circuit of the third embodiment of this invention. The circuit of the image display position control circuit is comprised of a ramp generator 61, an amplifier 3, a vertical deflection coil 4, resistors 5 and 6, a coupling capacitor 70, a cathode ray tube 7, a variable voltage power supply 63, and a comparator 62. The circuit operation is explained while referring to FIG. 8. The ramp generator 61 input with the V sync signal is a ramp generator of the capacitor-discharge type of the conventional art. The portion of the image display position control unit comprised of an amplifier 3, a vertical deflection coil 4, resistors 5 and 6, a coupling capacitor 70, and a cathode ray tube 7 is a typical AC coupling vertical deflection circuit. When a V sync signal in which the period 69 is greater than the period 68 is input to the ramp generator 61, the current flowing in the vertical deflection coil 4 forms the ramp waveform 65. On the other hand, the comparator 62 is input at one terminal with a voltage equivalent, for instance, to 562 horizontal scanning lines per field as a reference voltage Href. At the other terminal, an input voltage Hcount is equivalent to the number of horizontal scanning lines per field (for instance, 563 lines) read out from the field memory. The voltages at both inputs are then compared and a control signal is output as shown by the waveform 67 in FIG. 8. This control signal is high for fields with a large number of scanning lines, in other words, when Href is less than Hcount. For all other fields, the signal is low, for instance, when Href is greater than Hcount, or when Href equals Hcount. By inputting this control signal to the variable voltage power supply 63, the amount of current bypass of the vertical deflection coil 4 can be regulated. Accordingly, the electrical current value of the vertical deflection coil 4 can be compensated (offset) to match the dotted line 66 for the period 69. Consequently, even if the number of horizontal scanning lines per field is changed, a satisfactory screen image without jitter can be achieved. This circuit arrangement can also of course be applied to FIG. 4.

Figure 9:
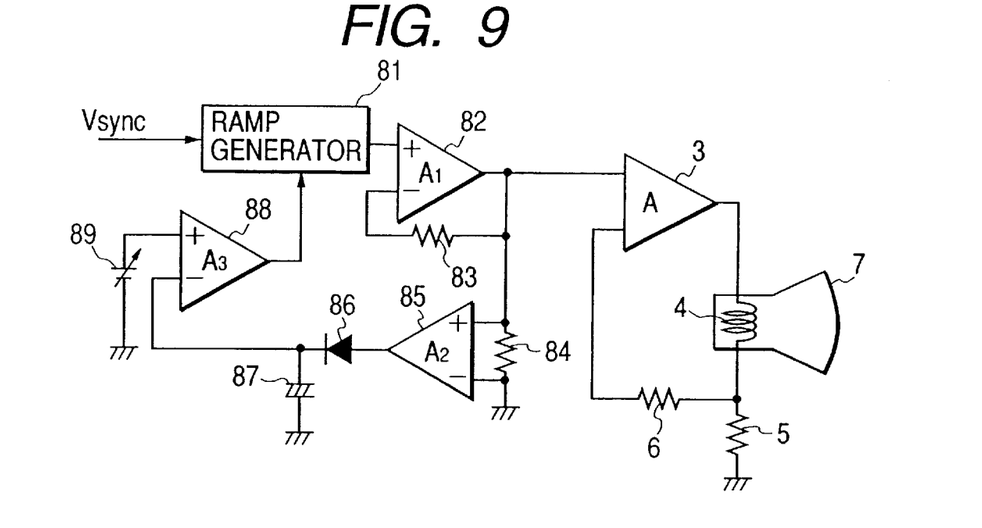
FIG. 9 is a circuit diagram showing an example of the image display position control unit of the fourth embodiment of th is invention.

FIG. 9 is a circuit diagram showing the image display position control unit 152 of the fourth embodiment of this invention. The circuit of the image display position control unit is comprised of a ramp generator 81, amplifiers 3, 82, 85, 88, a vertical deflection coil 4, resistors 5, 6, 83, 84, a capacitor 87, a cathode ray tube 7, a variable voltage power supply 89, and a diode 86. Next, the circuit operation will be explained while referring to FIG. 9. A clamped vertical ramp waveform is output at the output of the ramp generator 81 which is input with the V sync signal. When this signal output is input to a buffer circuit comprised of an amplifier 82 and resistors 83 and 84, a vertical ramp waveform is output at both ends of the resistor 84. A direct current voltage can be obtained according to the amplitude of the vertical ramp waveform by utilizing a rectifier circuit comprised of the amplifier 85, the diode 86, and the capacitor 87 on the voltage at both ends of the resistor 84. This direct current voltage value is input to an amplitude adjustment terminal of the ramp generator 81 by way of the amplifier 88 so that the amplitude of the vertical ramp waveform is always maintained at a fixed value. The variable voltage power supply 89 is connected to one side of the amplifier 88 to permit amplitude adjustment. In this circuit, a large value is set for the capacitor 87 and if a long time constant of, for instance, 80–120 ms or more preferably looms is set, then there is no follow-up of changes in field frequency for an interval of five to six fields. Consequently, the start position of the electron beam of the cathode ray tube 7 can be constantly maintained at a fixed location. Further, the raster size can also be maintained at a fixed value even if changes occur in the field frequency reference. Accordingly, there will be no change in screen size even in cases such as custom VTR playback. Also, even if changes occur over a short time in the number of horizontal scanning lines per field, the scan start position of the electron beam is constantly held at a fixed position so that a satisfactory image without jitter is obtained.

Figure 10:
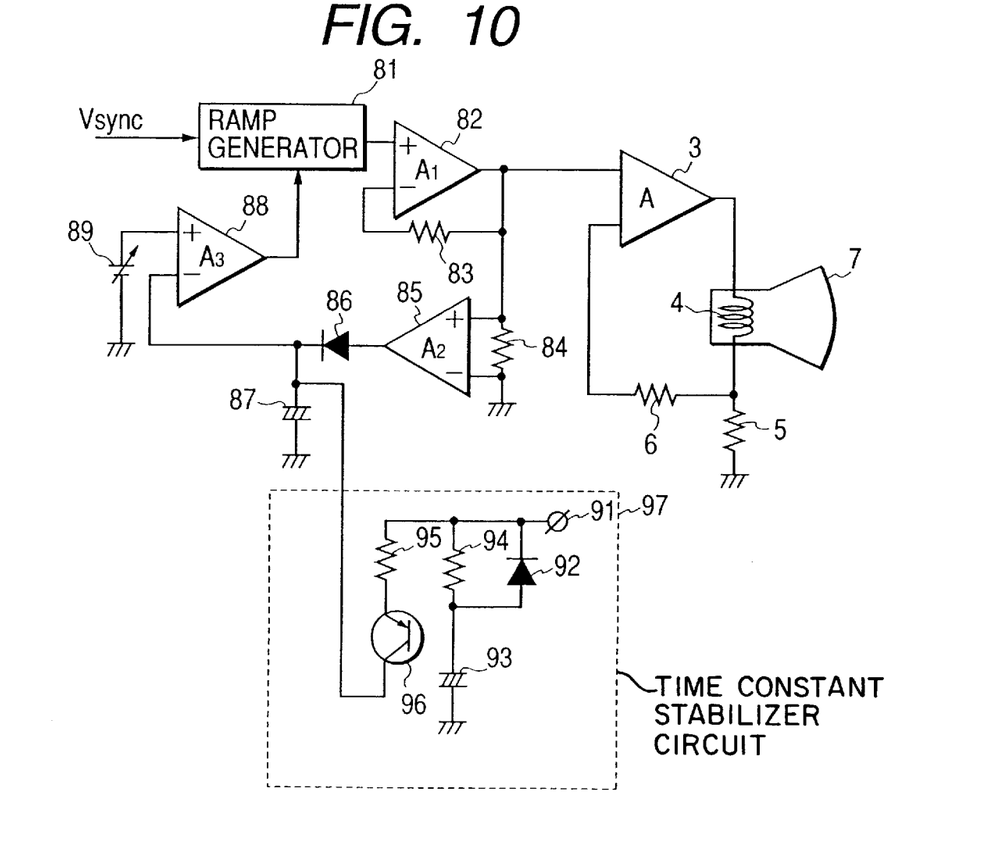
FIG. 10 is a circuit diagram showing an example of the image display position control unit of the fifth embodiment of this invention.

FIG. 10 is a circuit diagram showing an example of the image display position control unit of the fifth embodiment of this invention. This circuit is basically the circuit of FIG. 9 to which a time constant stabilizer circuit 97 has been added. In contrast to the circuit operation of FIG. 9, when the value of the capacitor 87 has been increased in order to obtain a sufficient time constant, the time until the vertical ramp waveform amplitude is sufficient becomes long, and the load on the cathode ray tube 7 is therefore large versus the on and off operation of the power supply. The time constant stabilizer circuit 97 is utilized in order to improve this situation. The circuit operation is next described. The time constant stabilizer circuit 97 is comprised of a transistor 96, resistors 94 and 95, a diode 92, a capacitor 93, and a power supply terminal 91. The power supply terminal 91 has zero volts and the charge on the capacitor 93 is zero with the power supply off. When the power supply is on, or in other words when it is turned on, power is supplied to the power terminal 91 and the capacitor 93 is charged by way of the resistor 94. At this same time, the transistor 96 turns on and the capacitor 87 is rapidly charged by way of the resistor 95 which speeds up the time needed for the vertical ramp waveform to reach the correct amplitude. In other words, when the power supply is turned on, the time needed to charge the capacitor 87 is less than in normal operation (for instance, 10 ms or less) and the follow-up time is shortened.

When the capacitor 93 has completely charged, the emitter and base of the transistor 96 are at the same electrical potential, and the transistor reaches cutoff status with no effect on the operation of the capacitor 87. Compared to the circuit status of the fourth embodiment shown in FIG. 9, the capacitor 87 of the circuit of FIG. 10 is set to an even larger value, the time constant is long and if, for instance, the time constant is set to 400–600 ms or more preferably to approximately 500 ms, then there is no follow-up of changes in field frequency over 50 to 60 fields so that just as in the first embodiment, the vertical start position of the electron beam of the cathode ray tube 7 can be constantly maintained at a fixed position. Further, the raster size can also be maintained at a fixed value even if changes occur in the field frequency reference. Accordingly, there will be no change in screen size even in cases such as custom VTR playback. Also, even if changes occur over a short time in the number of horizontal scanning lines per field, the scan start position of the electron beam is constantly held at a fixed position so that a satisfactory image without jitter is obtained.

As related in the above explanation, in this invention, even during display of video information in which irregular changes in the number of field scanning lines occur, the vertical jitter can be satisfactorily suppressed.

Although the above described embodiments represent preferred forms of the invention, it should be understood that modifications and changes will be apparent to those skilled in the art without departing from the spirit of the invention. The scope of this invention is therefore to be determined solely by the appended claims.

What is claimed is:

1. A digital television signal receiver comprising:
   a decoder, capable of decoding digital television signals having a plurality of different formats, which outputs video information in which image fields having mutually different numbers of scanning lines appear aperiodically when the decoder decodes a digital television signal having a specific one of the different formats;
   a display device which displays an image based on the video information output from the decoder; and
   an image controller which sets respective display start positions for the image fields having mutually different numbers of scanning lines to a same display start position in a vertical direction when the display device displays an image based on the video information output from the decoder when the decoder decodes the digital television signal having the specific format.

2. A digital television signal receiver according to claim 1, wherein the display device scans the image in the vertical direction based on a vertical ramp waveform; and
   wherein the image controller includes a controlling circuit which controls one of a DC level and an amplitude of the vertical ramp waveform.

3. A digital television signal receiver according to claim 2, wherein the vertical ramp waveform includes a vertical retrace period; and
   wherein the controlling circuit includes a clamp circuit which maintains a DC level of the vertical ramp waveform during the vertical retrace period constant for each of the image fields having mutually different numbers of scanning lines.

4. A digital television signal receiver according to claim 1, wherein the display device scans the image in the vertical direction based on a vertical ramp waveform including a vertical retrace period; and
   wherein the image controller includes a voltage controlling circuit which controls a voltage of the vertical ramp waveform during the vertical retrace period.

5. A digital television signal receiver according to claim 1, further comprising a clock generating circuit which generates clocks for use in decoding the digital television signals; and
   wherein the decoder decodes the digital television signals using the clocks generated by the clock generating circuit.

* * * * *